Patented Sept. 27, 1938

2,131,041

UNITED STATES PATENT OFFICE 2,131,041

NONEXPLOSIVE PYROTECHNIC COMPOSITION

George C. Hale, Dover, N. J.

No Drawing. Application April 10, 1936,
Serial No. 73,768

1 Claim. (Cl. 52—24)

(Granted under the act of March 3, 1883, as
amended April 30, 1928; 370 O. G. 757)

The invention described herein may be manufactured and used by or for the Government for governmental purposes, without the payment to me of any royalty thereon.

This invention relates to a non-explosive pyrotechnic composition.

One of the disadvantages of the various compositions in general use for pyrotechnic purposes is the explosion hazard which exists in the manufacture and use of such materials. This explosion hazard is largely due to the fact that the materials when mixed are sensitive to shock and will not stand the ordinary drop tests without detonating.

While it has been suggested that pyrotechnic compositions be made of ingredients which, upon combustion, produce solids instead of gases, such compositions have not come into general use for the reason that they alone do not make a satisfactory pyrotechnic composition but must have incorporated with them a gaseous forming substance which brings the mixture within the class-explosive.

The present invention resides in the fact that gaseous forming substances may be mixed with substances which upon combustion unite to form solids to form efficient and satisfactory pyrotechnic compositions for long burning signal lights of high candle power while maintaining the non-explosive character of the composition.

In carrying out the invention a mixture is prepared which consists; first, of an oxide or a chromate or both as the oxidizing component of the mixture, second, of one or more metals which are adapted to react with the oxides and chromates to form solid compounds, third, of a light intensifier which yields gas upon combustion. These substances are so proportioned that the gas yielding substance or substances will not exceed twenty-five percent by weight of the whole.

Upon reaction of the ingredients mentioned in the last paragraph the oxygen as given off by the oxides or chromates combines with the metal magnesium to form a solid, while the constituents selected from the compounds of the alkali or alkaline earth elements of Groups I and II of the Periodic Table of chemical elements and which include among others, sodium, potassium, barium and strontium, produce gas and intensify the light.

Examples of non-explosive pyrotechnic compositions prepared in accordance with the invention herein set forth are as follows, the proportions being by weight:

|  | Per cent |
|---|---|
| 1. Iron oxide | 55 |
| Magnesium | 30 |
| Barium nitrate | 10 |
| Sulphur | 5 |
| 2. Barium chromate | 68–70 |
| Magnesium | 25–27 |
| Sodium nitrate | 3 |
| Linseed oil | 2 |
| 3. Strontium chromate | 53 |
| Magnesium | 40 |
| Strontium nitrate | 5 |
| Castor oil | 2 |
| 4. Potassium bichromate | 30 |
| Strontium peroxide | 20 |
| Magnesium | 35 |
| Strontium resinate | 15 |

As may be readily seen from the examples given above a binder may be used with the mixtures when deemed necessary or desirable.

Drop tests have shown that when more than 25% by weight of the gas producing element or elements is present in the mixture they are explosive. This test is the usual one of subjecting a specimen of the mixture to the blow delivered by a 2 kg. weight falling freely from a stated height.

I claim:

A pyrotechnic composition including a metallic oxidizing agent selected from the class consisting of chromates and oxides, a metallic fuel adapted to react with the oxidizing agent to form a solid, and a gas-forming and light-intensifying alkali or alkaline earth compound selected from the class consisting of nitrates, and resinates, in an amount less than twenty-five per cent of the whole.

GEORGE C. HALE.